United States Patent

Hammond

[11] Patent Number: 5,905,642
[45] Date of Patent: May 18, 1999

[54] APPARATUS AND METHOD TO REDUCE COMMON MODE VOLTAGE FROM CURRENT SOURCE DRIVES

[75] Inventor: Peter W. Hammond, Westmoreland County, Pa.

[73] Assignee: Robicon Corporation, New Kensington, Pa.

[21] Appl. No.: 08/967,466

[22] Filed: Nov. 11, 1997

[51] Int. Cl.[6] .................................................. H02M 5/45
[52] U.S. Cl. .............................................. 363/37; 363/39
[58] Field of Search ................................... 363/35, 37, 39; 318/800, 811

[56] References Cited

U.S. PATENT DOCUMENTS 5,646,498  7/1997  Lipo et al. .................................. 363/37
5,808,882  9/1989  Mochikawa ................................ 363/46

OTHER PUBLICATIONS

ABB Industries AG Product Brochure titled ACS 1000 Drive Description. Distributed at an IEEE Conference this past winter, 1997. pp. 3–11.

"Use of a LC Filter to Achieve a Montorfriendly Performance of the PWM Voltage Source Inverter," by Juergen K. Steinke et al., pp. TA2–4.1 thru TA2–4.3, published in the IEEE Journal in 1997.

ABB Industries AG Product Brochure entitled The ACS 1000 is performance simplified. The date of this brochure is unknown, but might be late 1997 as with Item 1.

Bin Wu and Frank DeWinter, "Voltage Stress on Induction Motors in Medium Voltage (2300–6900V) PWM GTO CSI Drives", IEEE Transactions on Power Electronics, vol. 12, No. 2, Mar. 1997 pp. 213–220.

Bang Sup Lee, Prasad N. Enjeti, Ira J. Pitel, "A New 24–Pulse Diode Rectifier System for AC Motor Drives Provides Clean Power Utility Interface With Low kVA Components", IEEE 1996.

*Primary Examiner*—Shawn Riley
*Attorney, Agent, or Firm*—Buchanan Ingersoll, P.C.

[57] ABSTRACT

A common mode reactor between a DC converter and an AC converter to reduce common mode voltage from current source drives. Smoothing reactors are also placed in the DC current path. Additionally, a combined DC smoothing inductor and common mode reactor can be built on a common core. The single core can be a three legged core having two coils.

29 Claims, 8 Drawing Sheets

APPARATUS AND METHOD TO REDUCE COMMON MODE VOLTAGE FROM CURRENT SOURCE DRIVES

FIELD OF THE INVENTION

The invention relates to AC power converters, typically AC power supplies to drive AC motors. These power supplies can have an AC to DC converter which is fed from an AC power source and converts the AC power source into an intermediary DC source. A DC to AC converter is fed from the intermediate DC source by means of a DC link. Solid state switching components can be used in both the AC/DC and the DC/AC converter portions of the drive.

BACKGROUND OF THE INVENTION

Figure 1A:
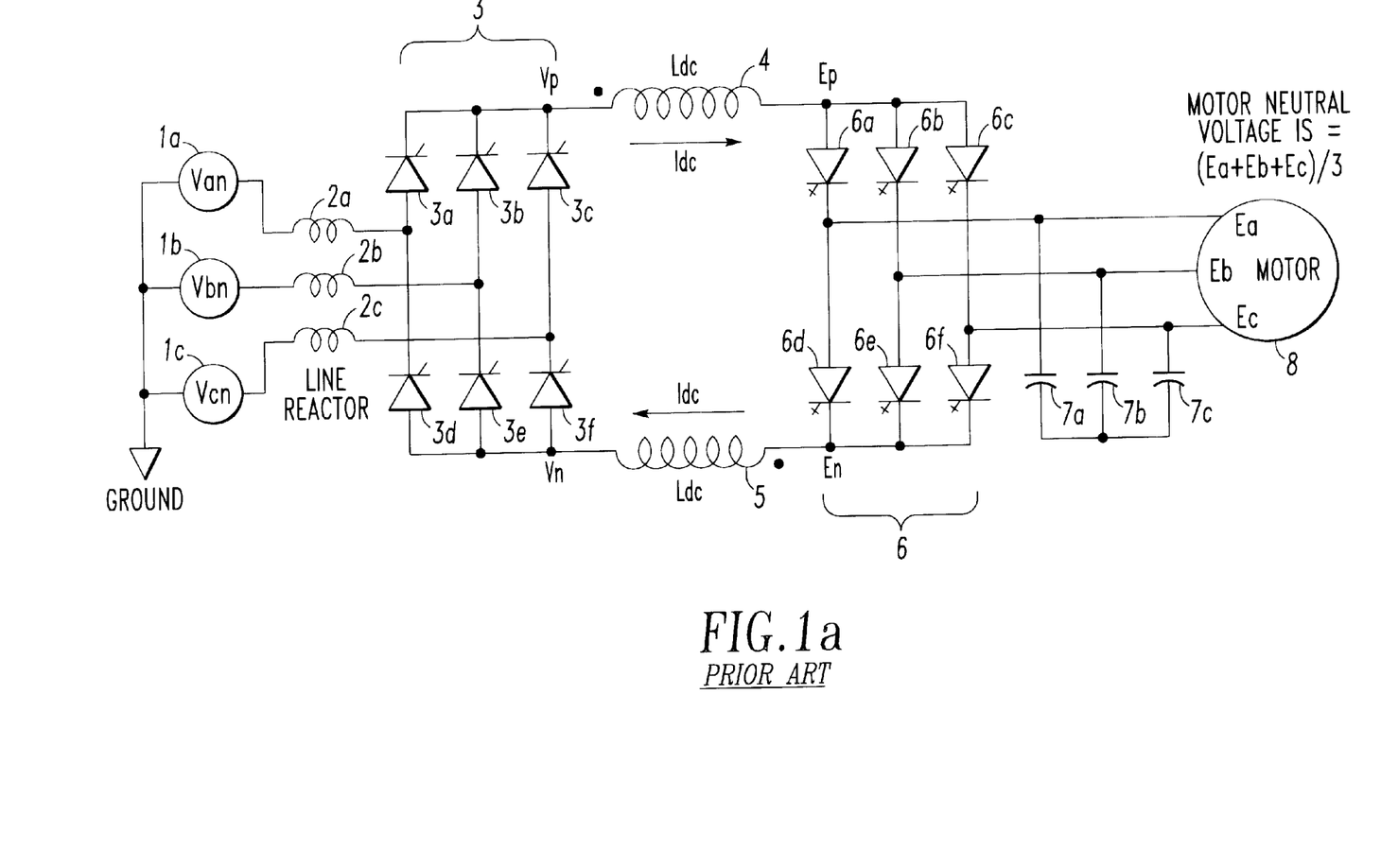
FIG. 1a shows a typical prior art current source drive circuit using SCR rectifier.

Adjustable output power supplies are commonly required in a wide variety of industrial applications, specifically to control the operation of an AC motor. Common prior art practice has been to create a two-portion drive, having an input portion to convert AC to DC and an output portion converting DC to adjustable AC. Both the AC to DC and the DC to AC portions of the drive will typically use solid state switching components. FIG. 1A shows a typical current source drive circuit. Such current source drives have three main disadvantages versus Pulse Width Modulated (PWM) voltage source drives; namely common mode output voltage, input harmonics, and variable input power factor. Of these disadvantages, the common mode output voltage may be the most critical, because its solution has traditionally required either a full rated input transformer or special motor insulation. These solutions can be expensive in both the cost of the additional equipment and in the physical space requirements associated with full rated transformers. FIG. 1a shows a typical current source drive circuit, a six-pulse rectifier converts three phase AC power from a utility to DC current. The neutral of the utility is usually grounded. This DC current flows through an inductor to a second converter (DC to AC), where it is converted back into three phase AC at a different or varying frequency. When the semiconductor switches are fired in either the input or output converters, there is a step change of voltage across the DC inductor. Even when the inductor is divided equally between the positive and negative paths as shown in FIG. 1a, half of the step change in voltage appears between the input and output neutrals. Since the input neutral is grounded, the entire voltage appears between the motor windings and ground. This voltage is called "common-mode" because it appears equally in all three output phases. In practice it increases the stress on the motor winding insulation. In some instances, the peak common-mode voltage can equal the peak line-to-neutral output voltage, which doubles the line-to-ground voltage on the motor. Two prior solutions to deal with the common-mode voltage are to increase the motor insulation to protect against the winding to ground, common-mode voltage; or to supply a full KVA rated input isolation transformer, which allows the input neutral to support the voltage. The problem in utilizing this type of drive with existing or older motors is that the option of increasing the motor insulation is not readily available. Utilizing full rated isolation transformers on the input provides the necessary common voltage isolation, but can be quite costly and requires additional space and maintenance for the transformer. While utilization of this type of drive with new motors can be effective if higher rated insulation is applied through the motors when purchased, this increases the cost of the motor, and does not reduce the common-mode voltage and its potential disadvantages. Because in certain configurations the above-described drive may have significant operating and cost advantages, it would be desirable to eliminate or greatly reduce the common-mode voltage at a minimum cost in this type of drive.

SUMMARY OF THE INVENTION

Figure 3:
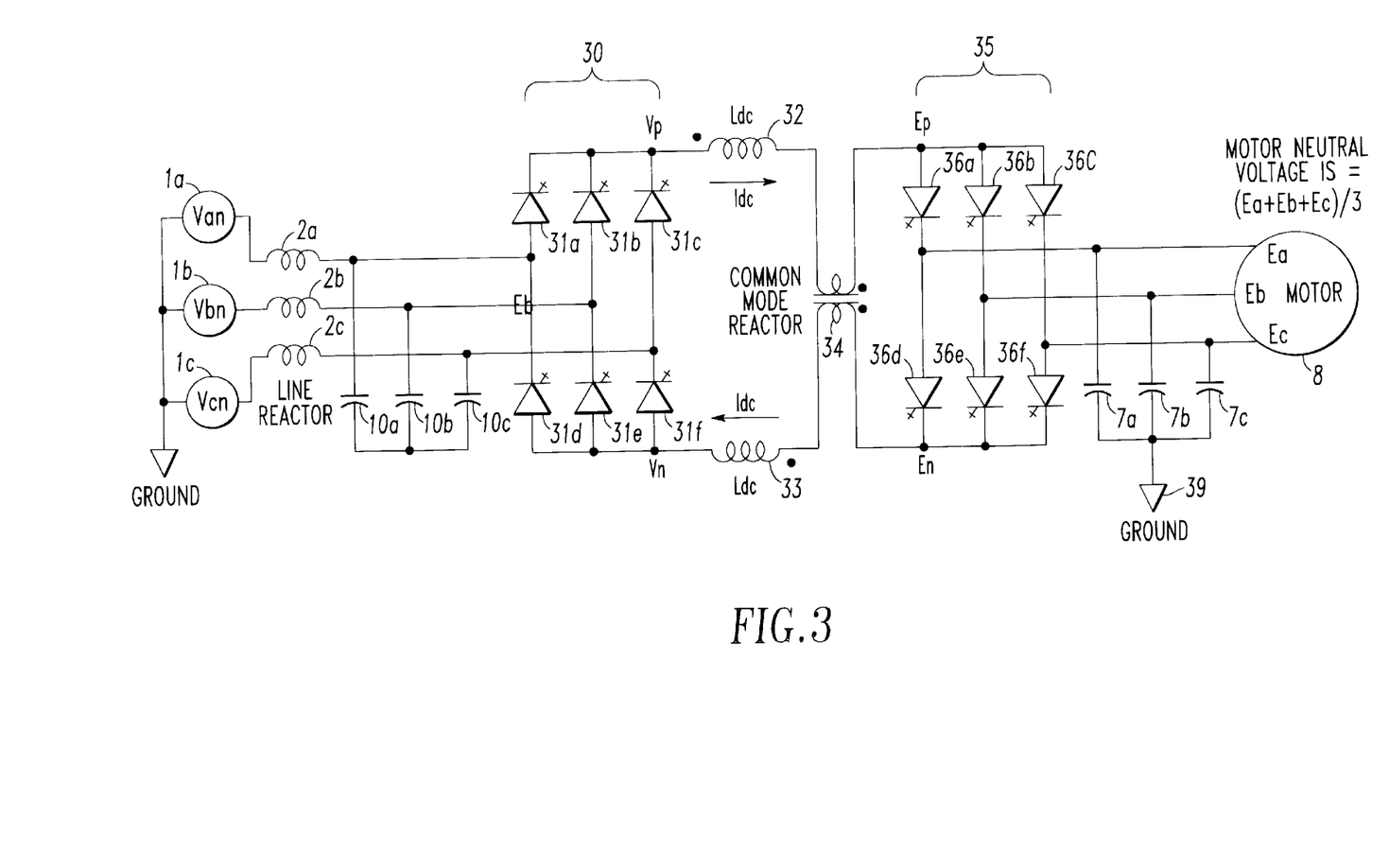
FIG. 3 shows an embodiment of a current source drive using a common-mode reactor.

A solid state drive is utilized to power an AC motor from a fixed AC voltage source. The incoming AC voltage is generally a utility supplied source with grounded neutral, and the drive does not require the utilization of an input transformer. The AC drive can be utilized as a directly connected controllable voltage or frequency source. The drive utilizes an input converter that converts the fixed voltage AC into a DC current output. The input converter in some embodiments can use solid state devices and may be either a regenerative or a non-regenerative bridge. The DC output of the input converter is smoothed with DC inductors. In preferred embodiments it is desirable to use one DC inductor with windings divided into two equal parts. Another option is to use two similar inductors. The two windings or inductors are connected in each polarity of the DC output. The DC current is also fed through a common mode reactor that is in series with the DC inductors. The current fed through the DC inductor and the common mode reactor is then fed through an output converter that converts DC into an adjustable AC supply. The common mode reactor is utilized to block any common mode current that might produce common mode voltage in the output. In some embodiments incoming line inductors and input converter capacitors are utilized as an input filter, as shown in FIG. 3. These may be tuned to a specific resonant frequency to reduce the input harmonic content. In other embodiments the output converter has a similar filter on its output side, except output line inductors are not needed due to the inherent motor inductances. Improved common mode current characteristics are obtained in this case by grounding the neutral on the capacitors in the output filter. Other embodiments may also ground the neutral on the capacitors on the input converter.

In some preferred embodiments the common mode reactor is constructed on a common iron core shared with the DC smoothing inductor. One embodiment of this combined core utilizes a three legged core connected by an upper and lower yoke. Coils on two legs provide both the DC inductance and the reactance required for both smoothing and common mode current suppression. The invention provides common mode voltage reduction from current source drives without using an input transformer nor special motor insulation ratings.

DESCRIPTION OF SOME EMBODIMENTS

To better understand the invention some reference to the prior art will demonstrate the problems with existing drives. FIG. 1a shows a typical current-source drive. The input to the drive is from the incoming AC voltage source 1a, 1b, 1c. Line reactors 2a, 2b, 2c are sometimes used to reduce the distortion caused by the drive on the incoming AC power. In the input converter 3 a rectifying bridge composed of SCRs 3a through 3f converts AC into DC. The DC from the input converter is fed through two separate DC inductor windings 4 and 5 to an output converter 6. The output converter 6 takes the DC current that has been supplied from the input converter and converts it back into three phase AC at various frequencies to control the motor 8. The output converter as shown in FIG. 1a uses six GTOs. This drive supply uses SCRs and GTOs. Other solid state switching devices can also be utilized, and have been utilized in the prior art. The cost of the specific device and the application to which the drive will be applied can influence the choice of switching device utilized. The switching devices in the input converter 3 and the output converter 6 can be envisioned as basically ideal switches which either conduct or do not conduct current. When these solid state switches are fired to control either the DC or the AC outputs of the respective converters, there is a necessary step change of voltage in the circuit. This step change results in a voltage across the DC inductor windings, 4 and 5. Even when the inductor is divided into two generally equal windings with one placed in the positive path and one placed in the negative path as shown in FIG. 1a, half of the step change in voltage appears between the neutrals of the input and output AC systems. Since the input neutral is grounded, this half-step appears between the motor windings and ground. The circuit in FIG. 1a uses GTOs in the output converter with filter capacitors 7a, 7b, 7c across the output of converter 6 and connected to each phase of motor 8.

Figure 1B:
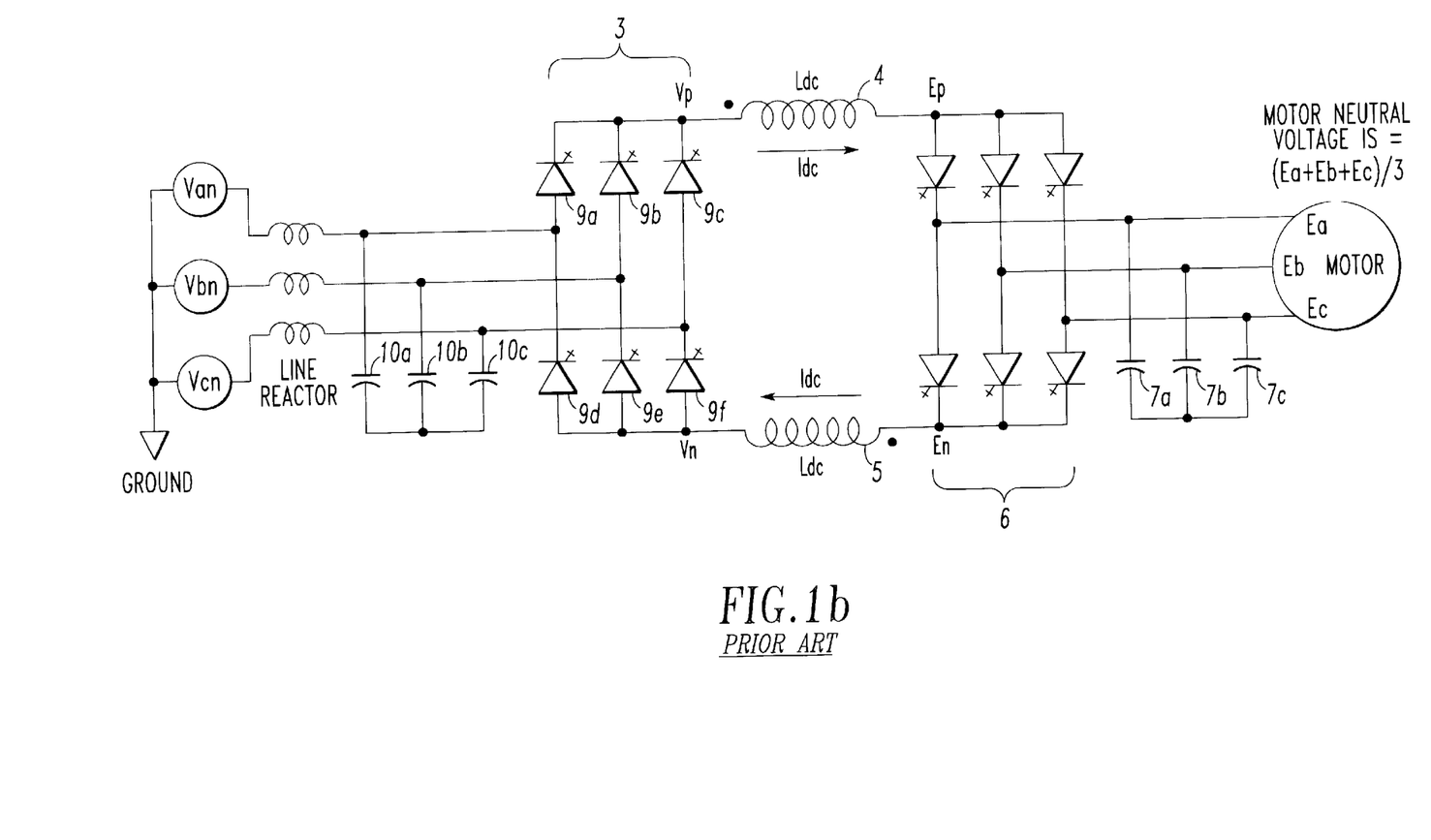
FIG. 1b shows a typical prior art current source drive circuit using GTO rectifier.

FIG. 1b shows a modified prior art drive similar to that shown in FIG. 1a. In FIG. 1b the input SCRs have been replaced by GTOs 9a through 9f. In addition, the input has filter capacitors 10a, 10b, 10c added across the AC input to the input converter 3. The capacitors 10a, 10b and 10c are similar to the output capacitors 7a, 7b and 7c. FIG. 1a uses the GTOs in the input converter 3 with pulse width modulation (PWM) to control the DC voltage output from the input converter 3. FIG. 1a with the SCR arrangement uses phase shift to control the DC voltage. Utilization of the pulse width modulation and the filter capacitors can improve the input harmonics and power factor. However, the modifications as shown in FIG. 1b can exacerbate the problem of common-mode voltage, because the number of switching events per cycle has been increased through the utilization of the PWM control of the GTOs in the input converter 3. The common-mode voltage problem can be solved in both FIGS. 1a and 1b by the installation of a full rated input isolation transformer. However, this solution to the common-mode voltage problem has a cost, maintenance, and size disadvantage. The present invention improves the prior art drives by reducing or eliminating the common-mode voltage problem in such drives without the necessity of a full rated incoming transformer or special motors having higher insulation values.

Figure 2:
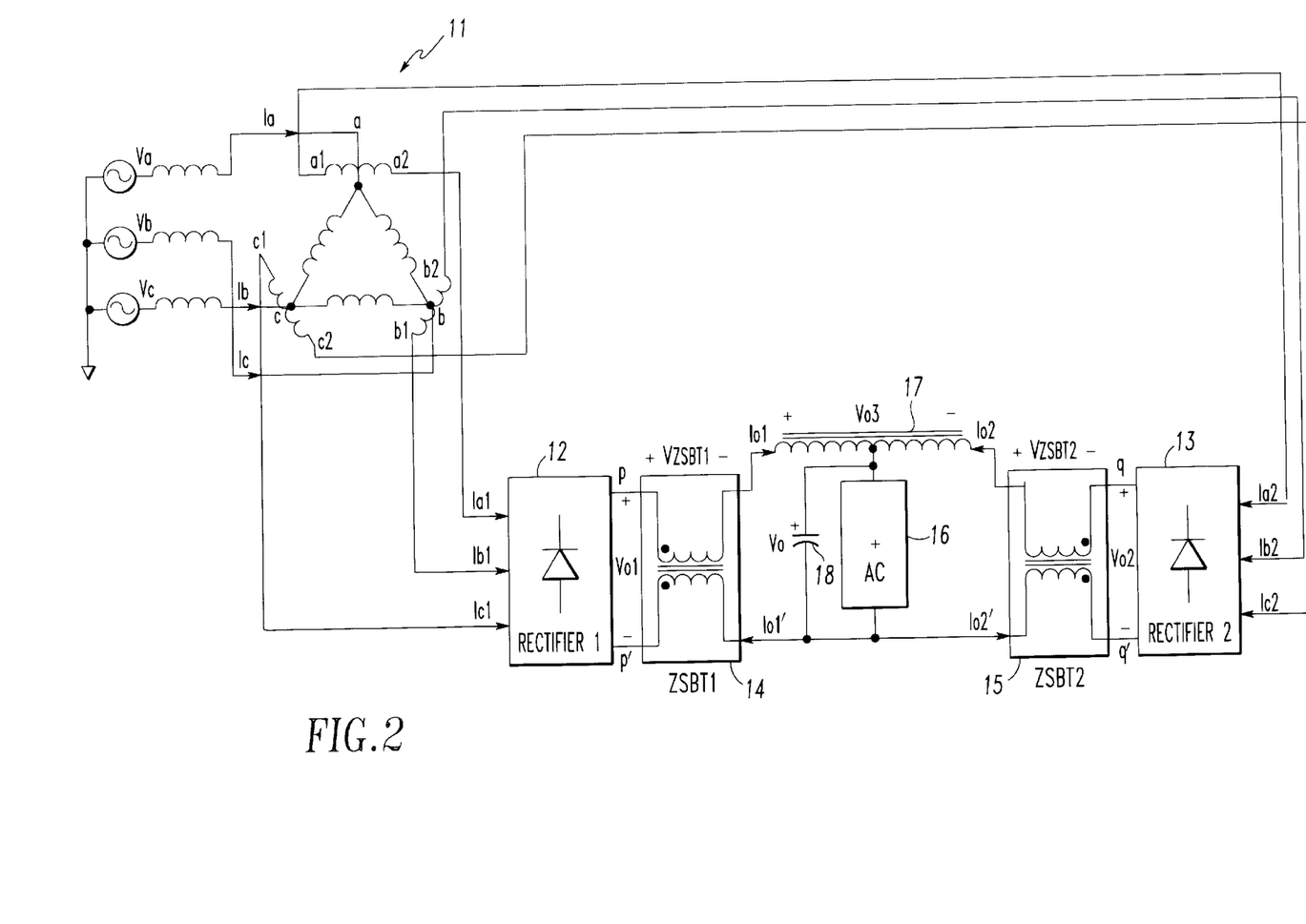
FIG. 2 shows prior art drive using autotransformer and two zero sequence blocking transformers.

FIG. 2 shows a prior art power supply utilizing a 12 pulse diode rectifier system suitable for the utility interface of a pulse width modulated voltage-source AC motor drive. A specially tapped interphase reactor is employed. The autotransformer 11 is fed from an AC source VA, VB, VC. Phase shifted output windings on the autotransformer feed two separate rectifiers 12 and 13 which convert the AC into two separate DC outputs. Rectifiers 12 and 13 respectively feed two zero sequence blocking transformers 14 and 15. The parallel outputs of the rectifiers 12 and 13 are fed into a common interphase reactor 17. The output of the interphase reactor 17 is a DC source which maintains the voltage on DC capacitor 18. The DC output from the combined rectifier is then converted into controlled AC power through an inverter 16. Inverter 16 could feed any type of load and would include feeding an AC motor to function as an AC motor drive. The object of the drive of FIG. 2 is to utilize the autotransformer and separate rectifiers in conjunction with a tapped interphase reactor to produce a 12 pulse system. Other embodiments proposed for the circuitry of FIG. 2 include a multi-tapped interphase reactor feeding through two isolating diodes into an AC inverter, thereby providing a 24 pulse system. The system shown in FIG. 2 uses an autotransformer and a special interphase reactor to achieve a higher pulse system, and may also result in some reduction in common mode currents. The 12 or 24 pulse systems represented by FIG. 2 while not using a full KVA isolation transformer do use a full sized autotransformer.

FIG. 3 shows an embodiment of the invention utilizing a drive that is connected directly to a power source such as a utility without intervening isolation or autotransformers. Incoming AC voltage sources 1a, 1b, 1c are connected through respective line reactors 2a, 2b and 2c. In this embodiment, a set of incoming line capacitors 10a, 10b and 10C are also utilized, however in other applications they may not be necessary. An input converter 30 converts AC to DC. As shown, the input converter 30 may be a rectifier bridge composed of GTOs. While the present embodiment shown in FIG. 3 utilizes GTOs, SCRs or other types of solid state switching devices would be equally applicable, and can be utilized depending upon cost and application. The input converter/rectifier feeds through two DC inductor windings 32 and 33. The output from the inductor windings is fed through a common mode reactor 34 into an output converter 35. The output converter 35 converts the DC supplied from the input converter into a controlled AC output. The output converter as shown utilizes six GTOs, 36a through 36f, in a bridge circuit arrangement to feed an AC motor 8. A set of output capacitors 7a, 7b, 7c are connected across the output terminals of output converter 35. As shown, the three output capacitors 7a, 7b, 7c have a common neutral connected to ground, at reference 39. The circuit shown for elimination of common mode voltage in FIG. 3 can be adapted to any CSI circuit, whether it is built with SCRs, GTOs, or other solid state switching device. A common mode reactor 34 has been added in series with the DC inductor windings 32 and 33. This common mode reactor 34 has two identical coils, the coils are connected into the positive and negative DC path in such a way that their DC ampere-turns sum to zero. Therefore, no DC flux is created in the iron core of the reactor 34. The reactor can therefore be built without air gaps. This, in turn, allows the reactor to have a very large impedance for currents that do not sum to zero, namely common mode currents. This large impedance to currents that do not sum to zero creates a blockage of such common mode currents from flowing in the circuit. The common mode reactor 34 supports whatever voltage is driving the current that would result from the common mode voltage. While the use of the common mode reactor 34 can substantially reduce and may in certain instances eliminate the common mode voltage resulting from switching currents, in some applications it may be desirable to also use additional precautions. The circuitry as shown in FIG. 3 also uses filter capacitors 7a, 7b and 7c in the output circuitry of converter 35. These starpoint or wye connected capacitors can then be grounded as shown at 39 to further reduce any remaining common mode voltage at the motor. As shown in FIG. 3, the two DC inductor windings can be coupled together if desired so that the two coils can share a single core. As seen from the circuitry and the polarities of the DC inductors, they provide the function of smoothing the DC current to the output converter.

The common mode reactor 34 as shown in FIG. 3, provides for blocking of the common mode current by a high impedance, but adds little DC inductance.

Figure 4:
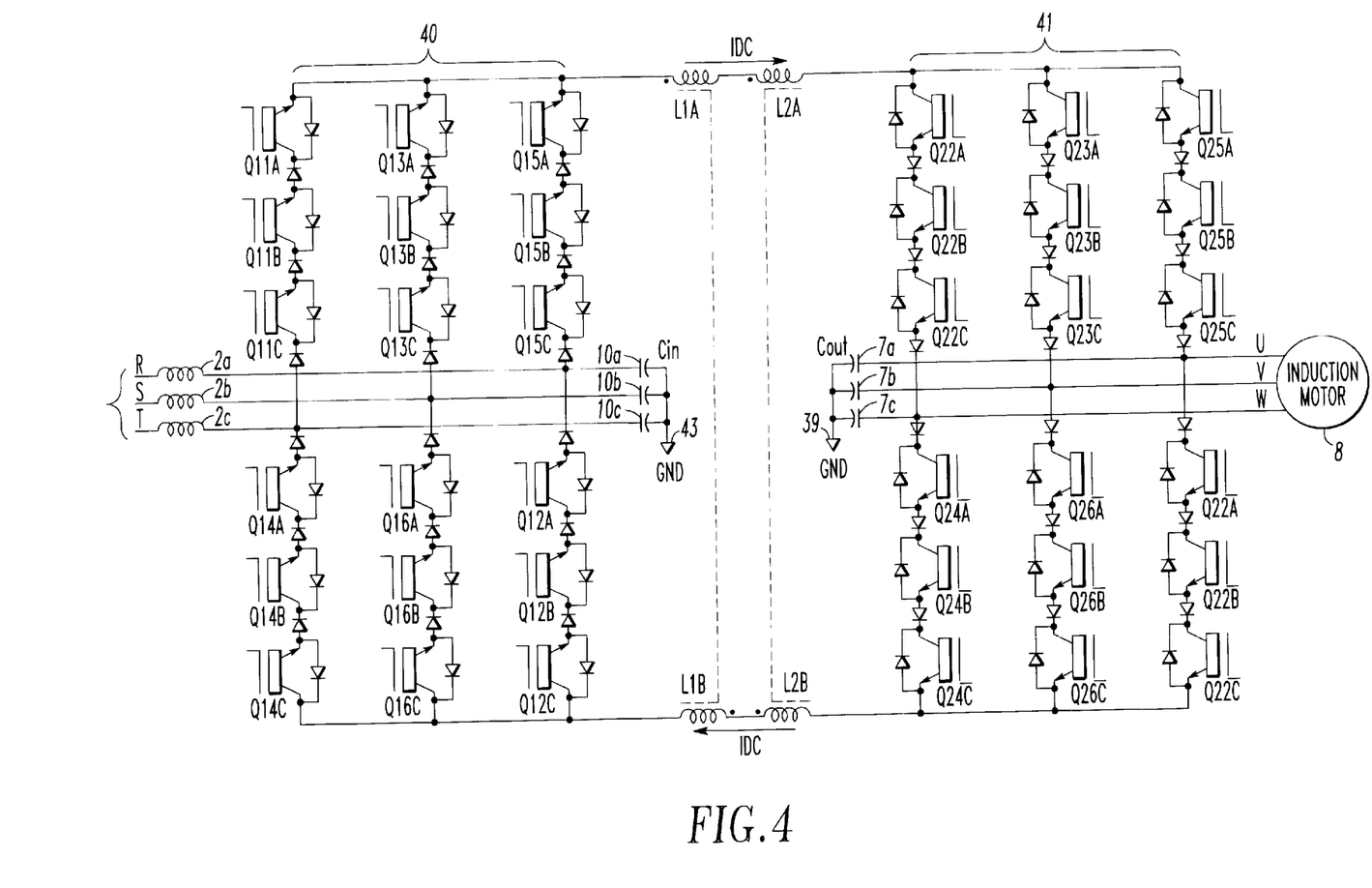
FIG. 4 shows an embodiment of a current source drive using a common-mode reactor combined with DC inductors in an IGBT circuit.
Figure 5A:
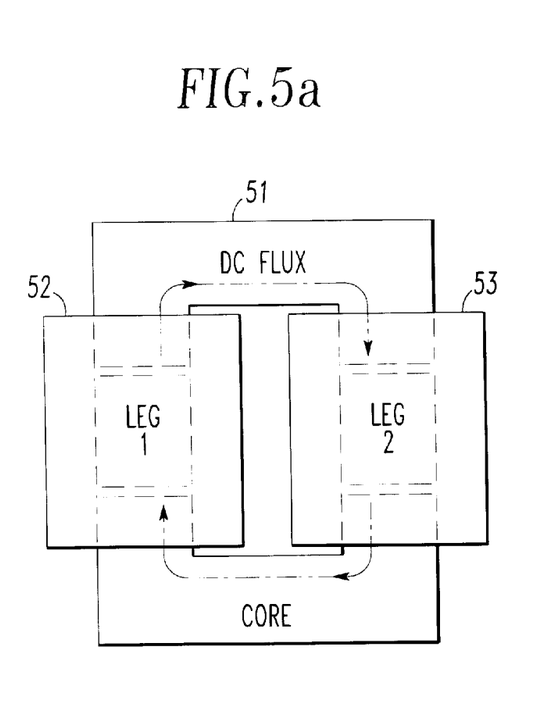
FIGS. 5a, 5b and 5c show three views of a preferred DC inductor construction.

FIG. 4 shows an embodiment of the invention using IGBT's in the input and output converters, and utilizing separate cores for both the DC inductors and the common mode reactor. Input from a three-phase source RST could be for example a 4160 three-phase 60 cycle line from a utility. Incoming line reactors 2a, 2b, 2c are utilized similar to that shown in FIG. 3. A set of input capacitors 10a, 10b and 10c are connected in a star configuration with an incoming ground 43. The input converter 40 utilizes an IGBT bridge topology. If utilized at 4160 volt input, 3.3 KV IGBTs could be used. In each string of the bridge three IGBTs are controlled in series as a single switch. This corresponds to six effective switches in the input converter. Such switches utilize IGBTs Q 11a, 11b, 11c, Q 12a, 12b, 12c, Q 13a, 13b, 13c, Q 14a, 14b, 14c, Q 15a, 15b, 15c and Q 16a, 16b, 16c. The output from the input converter 40 is fed through a DC inductor with windings L1a and L1b, and also through a common mode reactor with windings L2a and L2b. The IGBT circuitry shown in FIG. 4 could also be used with a single device combining the functions of the inductors and common mode reactor, and having only two windings on a single common core. That device, as will be discussed with regard to FIG. 5, can replace both the two DC inductor windings L1a and L1b and also the two windings L2a and L2b which comprise the common mode reactor. This combination of the DC inductors and the common mode reactors into one device can result in a significant cost savings and a reduction in the footprint of the inductive devices. The output from the input converter 40 is fed through the windings to an output converter 41. This converter also uses IGBTs in a bridge configuration. In both the input and output converter three IGBTs are used in series in each leg of the converter. However, other numbers of IGBTs or other switch devices could also be used. It will be noted that the input and output converters of FIG. 4 could be of identical construction and therefore permit manufacturing cost savings. IGBTs used in the output converter 41 include Q21a, Q21b, Q21c, Q22a, Q22b, Q22c, Q23a, Q23b, Q23c, Q24a, Q24b, Q24c, Q25a, Q25b, Q25c, and Q26a, Q26b, Q26c. The output converter feeds output lines U, V and W, and has output capacitors, 7a, 7b and 7c. The output capacitors are connected in a star arrangement having a ground, 39. This embodiment utilizes both an input ground 43 and an output ground 39 to further enhance the common mode suppression.

Figure 7:
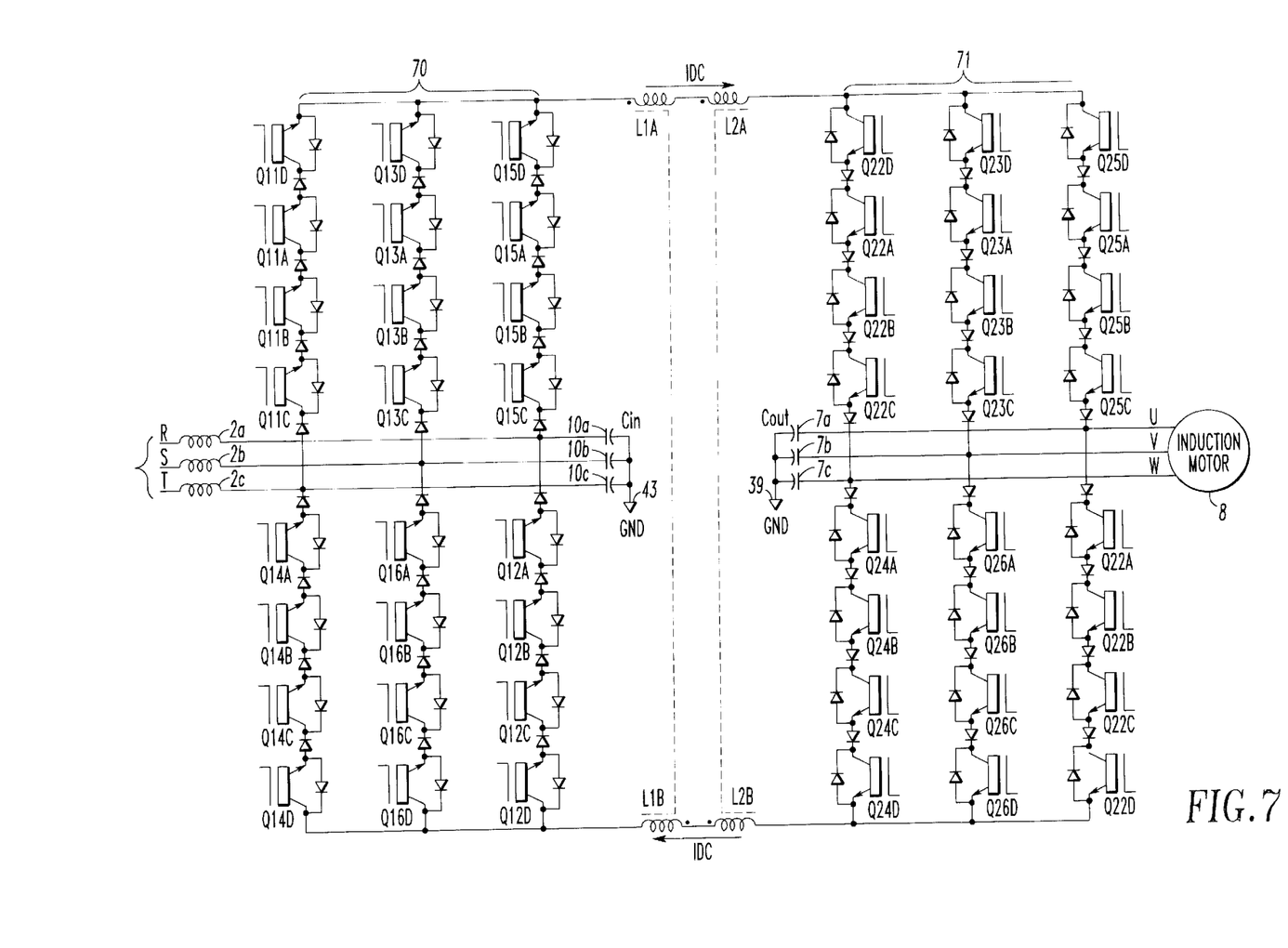
FIG. 7 shows another embodiment similar to FIG. 4 with redundant switching devices.

While the embodiment shown in FIG. 4 utilizes 36 IGBTs to form 12 switches, it is understood that other numbers of IGBTs or other solid state devices could also be utilized. In one embodiment it is desirable to include a redundancy in either the input or output converters to permit operation even under failure of a single component in the bridge. FIG. 7 shows such a redundant arrangement. The IGBT switches in FIG. 4 can be controlled by pulse width modulation (PWM) to generate AC current wave forms in which the harmonic content can be held above a threshold frequency such as, for example, 1500 hz. A switching frequency of about 66% of the threshold frequency may be used, such as 1000 hz. The input inductance 2a, b and c, the input capacitors 10a, 10b and 10c, and the output capacitor 7a, 7b and 7c can be chosen to resonate at about 20% of the threshold frequency, such as, for example, 300 hz. This resonant frequency may be at least five times higher than the maximum motor frequency. Thus the threshold frequency can be at least 25 times the maximum motor frequency. If the maximum motor frequency is 60 hz, the threshold can be 1500 hz or more. It is important in this embodiment that no harmonic currents exist between the operating and the threshold frequencies, to avoid exciting the resonance. If this condition is met, then almost all of the harmonic currents flow through the input and output capacitors 10a, 10b and 10c or 7a, 7b and 7c. The only currents through the utility or motor respectively are the sinusoidal fundamental components. The DC inductor L1a, L1b supports only high frequency ripple related to the switching frequency. As shown, L1a and L1b, need no reserve of flux density for fault handling utilizing the IGBT switching devices (the SCR designs may require a reserve flux density). This is because the IGBTs can be switched to a safe state without delay. Therefore, L1a and L1b can be relatively small compared to similar inductances in the SCR designs. It will be desirable to maintain the inductance between the capacitors and the IGBTs to a low value to avoid the necessity of using snubbers.

As shown in FIG. 4, the input converter 40 can utilize the IGBT switch devices to provide a source of DC to the output converter 41. Output converter 41 can use the IGBTs to switch the DC current into a controlled AC current.

Input inductor 2a, b, and c can be either single inductors or could be a common inductor with one core having three legs and three coils. It is desirable to use pulse width modulation on the input converters to remove low order harmonics. By operating at higher frequencies the pulse width modulation reduces the lower undesirable AC side harmonics. Higher frequency harmonics can then be suppressed through the utilization of the incoming line capacitors 10a, 10b and 10c. One advantage of IGBTs is that they can switch faster than SCRs or GTOs.

The output capacitors 7a, 7b and 7c as shown in FIG. 4 act in conjunction with the inductance of motor 8 to provide harmonic filtering on the output of converter 41. One of the advantages of using the symmetrical converter circuitry shown in FIG. 4 is that the input converter and the output converter can be similar and can be operated so that power may be regenerated from motor 8 back into the AC line R, S and T. The output filter using the capacitance 7a, 7b and 7c has a ground connected to it at 39. It is desired that the common mode reactor prevent common mode currents, however, there may still be a low level common mode current that results because the common mode reactors are never ideal, that they do not have an infinite impedance with respect to the actual common mode voltages. Therefore, by utilization of the ground 39, a shunt path is provided for any residual low level common mode currents that still flow through the common mode reactor. The shunt path through ground 39 prevents a residual common mode voltage from impressing a stress on the motor 8 insulation. As shown, capacitors 10a, 10b, 10c and 7a, 7b and 7c need not be electrolytic capacitors. The capacitors can be oil-filled PF types. One of the objects of the invention is to reduce the maintenance and size required by the electrolytic capacitors utilized in other drives.

Figure 5B:
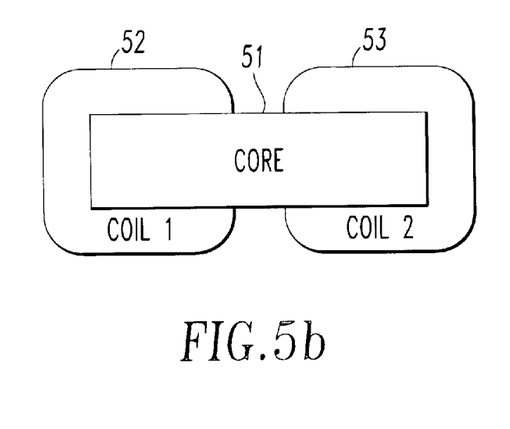
Figure 5C:
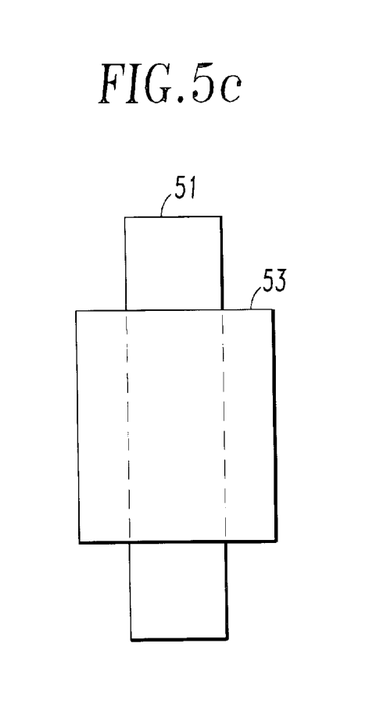
Figure 6A:
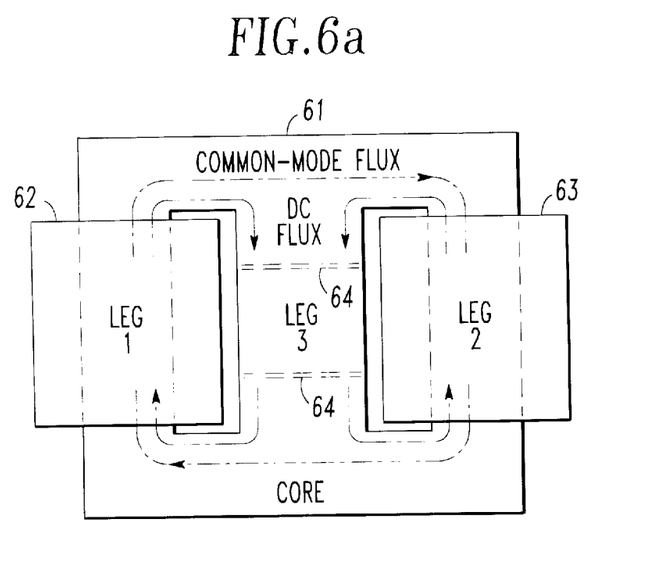
FIGS. 6a, 6b and 6c show a preferred constructions of a DC inductor to block common-mode voltage.
Figure 6B:
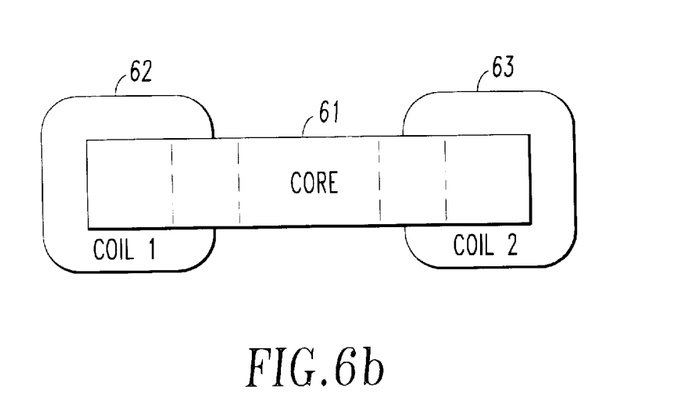
Figure 6C:
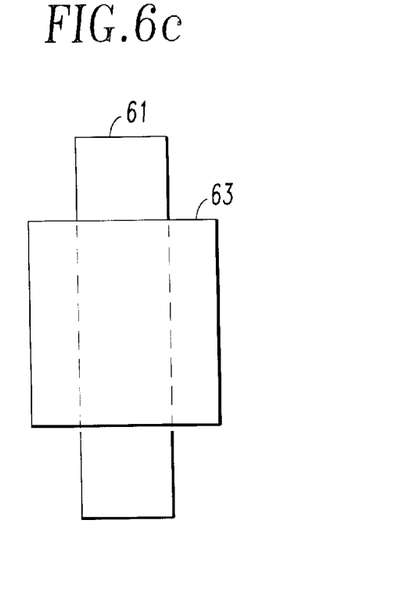

As has been shown in FIGS. 3, 4 and 7, the invention uses DC inductors and a common mode reactor. As has been pointed out, it is desirable to further reduce the cost and size of the drives utilizing the invention by utilizing a common core for the inductances. FIGS. 5 and 6 show some possible constructions. FIG. 5 shows a method of constructing a DC inductor having two coils. Such inductor could be utilized as DC inductor windings 32 and 33 as shown in FIG. 3. Utilizing a common core for these two inductors further reduces the cost and footprint of drives utilizing the present invention. A core 51 of laminated electrical steel is built with two vertical legs, leg 1 and leg 2. The vertical legs are connected by horizontal top and bottom yokes. Two identical coils can be wound and one placed over each of the respective legs 1 and 2. The coils are connected into positive and negative paths such as shown at 32 and 33. They are connected in such a way that their amperes-turns add together. As shown in FIG. 5a, both coils are constructed such that the driving flux is through the core in the same direction, i.e., clockwise. At least one air gap should be present to provide reluctance to limit the flux density and establish the needed inductance. In practice several air gaps can be utilized in the laminated core construction as shown in FIGS. 5a, 5b, and 5c. This construction would be advantageous to provide a single core inductor to perform the function of FIG. 3 references 32 and 33.

FIG. 6 shows a device which provides both the DC inductor windings 32 and 33 as shown in FIG. 3 and the common mode reactance 34 as shown in FIG. 3. These functions are provided using only two windings on a single core. This device could be used to replace the windings L1a, L1b and L2a, L2b as shown in FIG. 4. It is particularly advantageous in that, this results in reduced footprint and manufacturing cost of the common core device shown in FIG. 6. The device in FIG. 6 functions as both the DC inductor and a common mode reactor. The common core 61 has three legs, leg 1, leg 2 and leg 3. Leg 3 as shown generally has a cross-sectional area larger than the cross-sectional area of leg 1 and leg 2. In practice it is desirable to make leg 3 have a cross-sectional area generally equal to the total cross-sectional area of both legs 1 and 2. The air gaps in the inductor are positioned in leg 3 rather than in leg 1 or leg 2. It is desirable that air gaps 64 be removed from the outer legs, leg 1 and leg 2. Leg 1 and leg 2 have a first and second coil, 62, 63 respectively installed thereon. Coils 62 and 63 are connected into the positive and negative paths of the output converter 40 as shown in FIG. 4. They are connected in such a way that both coils 62 and 63 create DC flux in the core in opposite directions. As shown in FIG. 6a, the DC flux comes out of the top of the coils from leg 1 and leg 2, and returns through leg 3. Because the flux is directed out the top of the coils, it must return through the bottom and therefore the path is through the air gaps in leg 3. These air gaps provide the reluctance to limit the flux density and establish the needed inductance for coils 62 and 63 to act as windings L1a and L1b in FIG. 4. It is to be remembered that the DC flux as shown in FIG. 6a is a result of the DC current from the output converter 40. Unlike the DC currents in the output converter, common mode current will create flux that flows in the same directions (clockwise) in the two outer legs. This requires that the common mode flux exit coil 62 from the top, and exit coil 63 from the bottom. This flux path requires that the common mode flux would circulate in coils 61 and 62 through the outer legs, leg 1 and leg 2. The common mode flux would not pass through the center leg or its respective air gaps, 64. FIG. 6a shows the common mode flux that would circulate in a clockwise direction through leg 1 and leg 2. The common mode voltages imposed will therefore encounter a very large impedance which will block the flow of the common mode current in the output from converter 40. As shown, coils 62 and 63 combine DC and common mode windings such that coil 62 acts as both L1a and L2a as shown in FIG. 4. Respectively, inductors L1b and L2b of FIG. 4 are both provided by coil 63.

Shown in FIG. 7 is a power supply or drive similar to that shown in FIG. 4. Like numbers describe similar devices as shown in FIG. 4. Input converter 70 generates a DC supply to feed output converter 71. As shown the input and output converters of FIG. 7 use IGBTs as switching devices. They operate and control power similarly to that which has been described with regard to FIG. 4. Input and output converters in FIG. 4 utilized six leg bridges with three IGBTs per leg. The embodiment shown in FIG. 7 utilizes redundant IGBTs so that should a single switching component fail, an additional switching component can be utilized to provide the necessary output function. As shown, each leg of each bridge contains an additional IGBT. Input converter 70 contains IGBTs Q11a–16d. These 24 IGBTs are located in groups of four in each of the six legs of the input bridge converter 70. Similarly output converter 71 utilizes additional redundant IGBTs Q21a–26d. While the devices shown are IGBTs it is understood that other bridges utilizing other solid state switching devices could also use such a redundant device. As shown, the basic device as described in FIG. 4 utilized three IGBTs in series. In that configuration the voltage was imposed equally across the three IGBTs, however, in other embodiments two or another number of IGBTs could be used in series to provide the desired voltage. The practice shown in FIG. 7 is to add an additional IGBT in each series string above that that would normally be desired using prudent engineering standards. This provides for full operation should a single IGBT fail. In the shorted mode, the voltage imposed across each element in the series string could be increased upon the remaining IGBTs to provide full voltage/current. The additional IGBT as shown in each string of FIG. 7 could be operated in a conducting mode continuously until such time as a failure occurs, however, it would be more desirable that the redundant device share the imposed voltage load equally with the other devices in the string. As such, during normal operation, the voltage level imposed across each individual IGBT would be reduced and could result in an improved device life expectancy. Upon failure of a single IGBT device the additional voltage would then be impressed equally upon the remaining devices and they would still be operated within their normal desired voltage range.

As the invention has been described hereinbefore, the embodiments have utilized an incoming AC to DC converter and a DC to AC output converter. It is to be understood that the common mode current reactor of this invention can also be utilized in AC to AC drives and AC to DC drives, without regard to the type of conversion that occurs. Other embodiments could use a single stage converter approach without a DC link. In these cases a three-winding common mode reactor can be placed in either the incoming AC line or in the output line of the converter. In these cases the reactor can consist of three of identical windings on a single magnetic core, so that they share the same magnetic flux and carry the same induced voltage. The polarity of coupling is the same in all three windings. In such other embodiments the common mode reactor does not need to be connected to the converter input, as long as it is somewhere between the neutrals of the input and the output AC system. Such embodiments can connect a three-winding common mode reactor between the input and converter, or between the output of the converter and the AC load such as an AC motor.

While the invention has been described utilizing certain specific solid state switch devices, it is to be understood that other embodiments of the invention will be apparent to those skilled in the art and that other solid state switching components may be utilized in practicing the invention within the scope of the claims. Similarly, while certain embodiments of the DC inductors and common mode reactor have been shown, it is to be understood that other inductor and reactor designs are included within the practice of the invention.

I claim:

1. A controllable solid state drive to power an AC motor from a fixed voltage AC input said drive comprising,
    (a) an input converter supplied from said fixed voltage AC and converting said fixed voltage AC into a DC output;
    (b) at least one DC inductor connected to the DC supplied from said input converter;
    (c) an output converter converting said DC output into an adjustable AC voltage to supply said motor; and
    (d) a common mode reactor in the current path of said DC output and interconnecting said input converter and said output converter.

2. The controllable solid state drive of claim 1 wherein said common mode reactor has two opposing windings wound on a common core so as to provide a high impedance path to block the flow of common mode current to said output converter.

3. The controllable solid state drive of claim 2 further including a set of incoming line reactors connecting said input converter to said fixed voltage AC input and further including a set of input capacitors connected to the input of said input converter.

4. The controllable solid state drive of claim 3 wherein said incoming line reactors and input capacitors are chosen to resonate.

5. The controllable solid state drive of claim 2 further including a set of output capacitors connected to the output of said output converter.

6. The controllable solid state drive of claim 5 wherein said output capacitors are chosen so as to resonate with the inductance in the respective windings of said motor to resonate at approximately 20% of a predetermined threshold frequency.

7. The controllable solid state drive of claim 3 further having output capacitors.

8. The controllable solid state drive of claim 5 further including a ground connected to a common point of said output capacitors.

9. The controllable solid state drive of claim 7 further including a ground connected to a common point of said output capacitors.

10. The controllable solid state drive of claim 7 further having a ground connected to a common point of said input capacitors.

11. The controllable solid state drive of claim 1 wherein said at least one DC inductor includes two DC windings and wherein said common mode reactor is wound on a common core with said DC windings.

12. The controllable solid state drive of claim 7 wherein said at least one DC inductor includes two DC windings and wherein said common mode reactor is wound on a common core with said DC inductors.

13. The controllable solid state drive of claim 11 wherein said core comprises a first leg, a second leg and a third leg connected with top and bottom yokes; said first and second leg each having a respective winding thereon; and said third leg having at least one air gap provided therein.

14. The controllable solid state drive of claim 12 wherein said core comprises a first leg, a second leg and a third leg connected with top and bottom yokes; said first and second leg each having a respective winding thereon; and said third leg having at least one air cap provided therein.

15. The controllable solid state drive of claim 14 further including a ground connected to a common point of said output capacitors.

16. The controllable solid state drive of claim 14 further having a ground connected to a common point of said input capacitors.

17. The controllable solid state drive of claim 13 wherein the cross-sectional area of said leg 3 is generally equal to the sum of the cross-sectional areas of said leg 1 and said leg 2.

18. A combined inductor/reactor for use in suppressing common mode currents in a power supply comprising:
    (a) a core having a first leg section, a second leg section and a third leg section connected by an upper yoke section and a lower yoke section;
    (b) a first coil mounted on said first leg;
    (c) a second coil mounted on said second leg;
    (d) said first coil oriented to direct DC flux and common mode flux into one of said upper yoke and said lower yoke; and
    (e) said second coil oriented to direct DC flux into said one of said upper yoke and said lower yoke thereby directing said DC flux of both of said first and second coils into said third leg and directing common mode flux into respective ones of said first and second leg.

19. The inductor/reactor of claim 18 further comprising said third leg having air gaps therein to provide a high reluctance path to said DC flux.

20. The inductor/reactor of claim 19 further comprising said third leg having a cross-sectional area generally equal to the sum of the cross-sectional areas of said first leg and said second leg.

21. A method to suppress common mode current in a controllable AC motor drive comprising:
    (a) converting AC from a fixed voltage utility source into DC;
    (b) smoothing said DC with at least one DC inductor in the DC current path;
    (c) converting said DC into controllable AC;
    (d) feeding the current in said DC path through a common mode reactor having at least two coils; and
    (e) positioning said coils to have opposite polarities and on a common core such that DC current flux from said two coils oppose each other in said core.

22. The method to suppress common mode current of claim 21 further comprising tuning the AC input to said converting of said AC with inductance and capacitance added to said AC source.

23. The method for suppressing common mode current of claim 21 further comprising tuning the AC output of said converting to controllable AC with capacitance to resonate with the inductance in the windings of said motor.

24. The method for suppressing common mode current of claim 22 further comprising tuning the AC output of said converting to controllable AC with capacitance to resonate with the inductance in the windings of said motor.

25. The method for suppressing common mode current of claim 23 further comprising ground a neutral of said capacitance that resonates with said motor windings.

26. The method for suppressing common mode current of claim 24 further comprising grounding the neutral of said capacitance added to said AC source.

27. The method for suppressing common mode current of claim 21 further comprising said smoothing by passing said DC current through at least one of said coils on said core.

28. The method for suppressing common mode current of claim 21 further comprising smoothing said DC by passing said DC current path through said two coils in opposing direction and providing a third flux path in said core for the flux of said DC current and said third flux path having an air gap.

29. A method of forming an inductor/reactor for suppressing common mode currents and smoothing a DC current output comprising:

(a) commonly connecting a first flux path, a second flux path and a third flux path in a magnetic core;

(b) establishing a flux path from said common mode current in said first path and said second flux path;

(c) establishing flux from said DC current in said first flux path and said second flux path; and (d) shunting said flux from said DC current through said third flux path having air gaps therein.

* * * * *

UNITED STATES PATENT AND TRADEMARK OFFICE
CERTIFICATE OF CORRECTION

PATENT NO. : 5,905,642
DATED : May 18, 1999
INVENTOR(S) : PETER W. HAMMOND

It is certified that error appears in the above-indentified patent and that said Letters Patent is hereby corrected as shown below:

On the Title Page

At [57] Abstract, line 2, after "converter", insert —is provided—.

Column 10, claim 14, line 10, change "cap" to —gap—.

Signed and Sealed this

Twenty-second Day of May, 2001

Attest:

NICHOLAS P. GODICI

Attesting Officer     Acting Director of the United States Patent and Trademark Office